(12) United States Patent
Benning et al.

(10) Patent No.: US 7,019,900 B2
(45) Date of Patent: Mar. 28, 2006

(54) PROJECTION DISPLAY SCREEN THAT IS LIGHT-REFLECTIVE RESPONSIVE TO INTENSITY OF INCIDENT PROJECTED LIGHT

(75) Inventors: Paul Benning, Lexington, MA (US); Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 10/771,493

(22) Filed: Feb. 4, 2004

(65) Prior Publication Data

US 2005/0168813 A1    Aug. 4, 2005

(51) Int. Cl.
 G03B 21/60 (2006.01)
 G02B 27/00 (2006.01)
 G02F 1/133 (2006.01)
 G09G 3/36 (2006.01)

(52) U.S. Cl. .................. 359/459; 359/578; 359/452; 349/33; 345/87

(58) Field of Classification Search ............... 359/443, 359/459, 452, 578, 449; 349/33; 345/84, 345/87
See application file for complete search history.

(56) References Cited

U.S. PATENT DOCUMENTS

| | | | |
|---|---|---|---|
| 6,597,501 B1 * | 7/2003 | Lambert et al. | 359/449 |
| 6,853,478 B1 * | 2/2005 | Vincent et al. | 359/296 |
| 6,853,486 B1 * | 2/2005 | Cruz-Uribe et al. | 359/443 |
| 2004/0012849 A1 | 1/2004 | Cruz-Uribe et al. | |

FOREIGN PATENT DOCUMENTS

| | | |
|---|---|---|
| EP | 1136874 | 9/2001 |
| EP | 1139158 A2 * | 10/2001 |
| EP | 1457963 A1 * | 9/2004 |

OTHER PUBLICATIONS

International Search Report dated Jun. 9, 2005.

* cited by examiner

*Primary Examiner*—W. B. Perkey
*Assistant Examiner*—Magda Cruz

(57) ABSTRACT

A projection display screen that can electrically alter the reflectivity of a region of the projection display screen in response to the intensity of incident projected light that is applied at the region.

36 Claims, 7 Drawing Sheets

PROJECTION DISPLAY SCREEN THAT IS LIGHT-REFLECTIVE RESPONSIVE TO INTENSITY OF INCIDENT PROJECTED LIGHT

FIELD OF THE INVENTION

The invention generally pertains to displays, and more specifically to projection display screens.

BACKGROUND

Projection display screens are categorized as front projection display screens and rear projection display screens (depending on the direction that the incident projected light is projected upon the projection display screen). Conventional projection display screens find it difficult to provide realistic black levels in that regions of the screen that should appear black to a user do not. Poor black levels also result in insufficient contrast between regions of the screen that should appear black and other regions of the screen.

One cause of the poor black level is that conventional front projection display screens typically are colored white to be able to reflect the incident projected light of many colors other than black. Incident projected light of any color other than black relies on the white background to make the color that is reflected off the screen and is directed to the user correspond to the color of the incident projected light. Regions of the projection display screen at which no incident projected light is directed (or a low intensity of projected light is directed) appear black. If sufficient ambient light is applied to a region of the projection display screen that should appear as black, the white screen reflects the color of the ambient light to the user, thereby producing unrealistic, poor, and/or washed out black levels. When these washed out black levels appear alongside regions that are receiving higher intensity light, a poor contrast between these adjacent regions occur with the washed out black portions appearing especially washed out.

It is therefore desirable to improve the reflective appearances of projection display screens.

BRIEF DESCRIPTION OF THE DRAWINGS

Illustrative and presently preferred embodiments of the invention are shown in the drawings, in which.

The same numbers are used throughout the document to reference like components and/or features.

DETAILED DESCRIPTION

Figure 1:
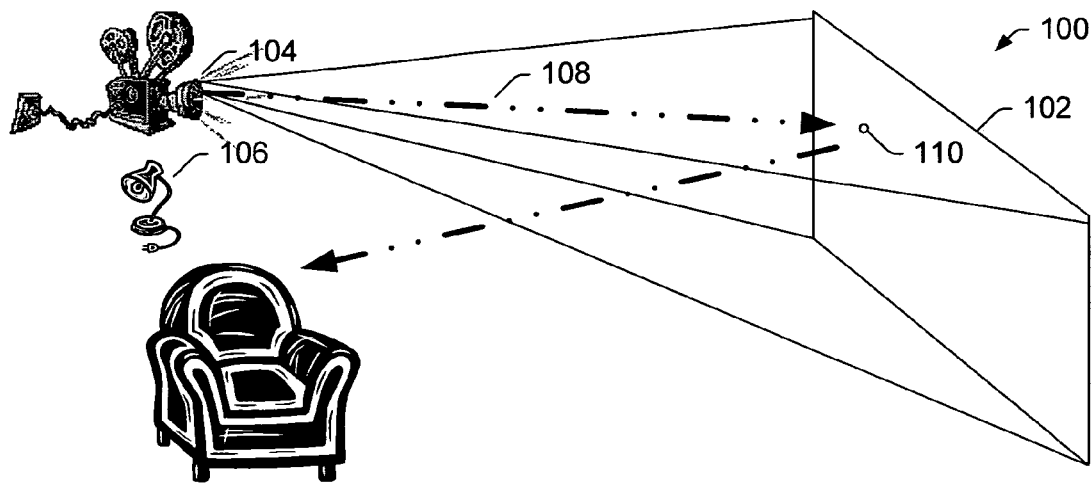
FIG. 1 is a schematic diagram of one embodiment of a projection display apparatus including a projection display screen.

One schematic diagram of an exemplary embodiment of a projection display apparatus 100 is shown in FIG. 1. The projection display apparatus 100 includes a projection display screen 102 and a light projection portion 104. The light projection portion 104 applies an incident projected light 108 at a region 110 on the projected display screen 102. Considering many projection display system environments, an ambient light source 106 may be positioned nearby to provide ambient light (e.g., room light) to the user. As such, the projection display screen 102 is configured to display a realistic image even when it is receiving ambient light in combination with the incident display light on the projection display screen 102.

A variety of colors and intensities of light are projected at regions forming the different embodiments of the projection display screen to electronically alter the regions of the screen to a different reflectivity, and make the screen display the desired image within the selected color for that display.

This disclosure provides a mechanism that improves the black levels that result when no light (or light of a sufficiently low level) is projected on the projected display screen for those regions 110 that are intended to appear black to a user. Within this disclosure, a "low intensity light" relates to light having little or low intensity (or combination of multiple low intensity lights) as perceived by a user of the projection display screen. By comparison, when a particular color is projected at a particular region of the projection display screen, that region assumes the color of the projected color. Any region of the projection display screen that of a given bandwidth (or a combination of bandwidths) that does not appear to the user as low intensity (black) is considered as receiving a high intensity light.

This disclosure provides a mechanism by which a region 110 of the projection display screen 102 is in a high reflectivity or a low reflectivity state based on whether high intensity light or low intensity light is applied to that region of the projection display screen 102. The transition of the region between its high reflectivity state and its low reflectivity state occurs at a particular intensity threshold value. Low reflectivity regions 110 reflect little or no ambient or incident projected light, and result when little or no light (or little intensity of a combination of colors of light) is applied to the projection display screen. High reflectivity areas reflect a larger percentage of the ambient of incident projected light.

High intensity projected light is made of one, or a combination of, the primary colors. A region receiving high intensity incident projected light appears to the user as the color of the incident projected light. As described within this disclosure, the application of high intensity light to a particular region of the projection display screen 102 will cause the region of the screen to turn to its reflective state, and reflect the color of the high intensity light to the user. In certain embodiments, the high intensity light can also include invisible (e.g., ultra-violet or infrared) light that is applied to a region 110 of the projection display screen that acts to make that region highly reflective.

In certain embodiments, the "intensity threshold" value is provided for one or more bandwidths, colors, or polarizations of light for each region 110. The intensity threshold can be either a set value, or can be adjusted by a user or installer considering the ambient light level to which the projection display screen is exposed. The intensity threshold value represents that level of incident projected light (for a selected bandwidth, color, polarization, etc.) of light at which each region 110 of the projection display screen transitions between its high reflectivity state to its low reflectivity state. In one embodiment, the intensity threshold value for transitioning from its high reflectivity state to its low reflectivity state may differ from the intensity threshold value for the opposite transition (in another embodiment it is the same). It different embodiments, the regions of the projection display screen can apply the intensity threshold value to a number of colors of bandwidths, or only one bandwidth.

There are a variety of techniques to set the intensity threshold. The intensity threshold value can be set above the highest typical amount of ambient light that each region of the projection display screen will often experience. In certain embodiments, a user or installer can set the intensity threshold value based on a level that appears good during normal viewing. In one embodiment, it is desired to use one or more bandwidth or polarization as the intensity threshold value which represents ambient light that the projection display screen infrequently encounters. As such, the selected bandwidth or polarization is considered as a signature bandwidth or frequency of light that only the light projection portion 104 (and not any ambient light) is likely to apply to the projection display screen. For example, the intensity threshold value can be applied in the invisible (e.g., infrared or ultraviolet) light spectrum by applying a color wheel to the light emitted from the light projection portion 104 that includes an invisible color filter as well as a visible light filter. Alternately, the intensity threshold value can respond to light of a particular polarization (having a particular polarization angle and/or frequency) that matches the polarization that is applied by the light projection portion 104.

As such, the present disclosure also provides a mechanism to improve contrast in the projection display screen 102 when a variety of light intensities are applied to the projection display screen 102. The regions 110 of the projection display screen to which a low intensity (or lack) of incident projected light is directed (and therefore appears as black) and the regions 110 at which a high intensity of incident projected light is directed should appear distinct, and the application of the ambient light to the low intensity regions of the projection display screen will absorb any ambient light directed at the low intensity regions, and will therefore not "wash out" the black. This reducing the wash out of the low intensity regions acts to improve the poor black levels and improve the contrast of the projection display screen 102. The concepts of the projection display screen 100 as described in this disclosure can be applied to a variety of display projection applications such as movie theaters, home video entertainment devices, high definition television, and the like.

In conventional front projection systems, the screen is typically colored white (e.g., has a high reflectivity) to display the color of the incident projected light. The white surface of the conventional projection display screen 102 allows both the color of the incident projected light and the ambient light to be illuminated on the screen. Poor black level and low contrast in conventional systems result when the dark regions 110 of the projection display screen 102 appear black by not receiving higher intensity incident light, but is illuminated by some ambient light to yield what is referred to herein as poor black levels (which represent a common deficiency for projection display screens 102). When the areas of the screen that appear black but instead appear as one or more colors due to ambient light, then the display will have low contrast between the low intensity regions 110 of the screen and the high intensity regions 110 of the screen.

This disclosure addresses the poor black level and poor contrast situations by using a projection display screen 102 that electronically alters its reflectivity to the incident projected light at each region 110 in response to the intensity of the incident projected light applied to that region 110. Within this disclosure, the regions 110 can be arranged in a pixelated format; each region can assume an independent arrangement, or another region format can be selected. It is possible for a number of the regions 110 to be arranged in a regular or an irregular pattern across the projection display screen.

Within different embodiments of the projection display screen 102, the regions 110 use a variety of techniques to electronically change their surface reflectivity in response to variations in intensity of the incident projected light upon the surface of the projection display screen 102.

During normal viewing operations, the high reflectivity regions 110 appear to a user as the color of the incident light. The low reflectivity state appears black in regions 110, and exists in those regions 110 where low intensity incident projected light is applied to the screen even if ambient light is applied to the region. This low reflectivity in the regions 110 that receives low intensity light improves the contrast between the regions 110 of the screen (especially since the low reflectivity regions suppress the reflection of ambient room light).

The regions 110 within the projection display screen transition between a high reflectivity state and a low reflectivity surface state at video frame rates, and are combined with a simple photoconductor circuit that are sensitive to as large or narrow band of projected incident light as desired considering the applications of the projection display screen as described within this disclosure. In effect, each region 110 on the projection display screen 102 remains highly absorbent of light until a sufficiently high intensity of light (of the right color or band of light) impinges on the projection display screen, and then the region 110 becomes highly reflective to reflect the color of the incident applied light to a viewer.

This disclosure now describes the structure and operation of a variety of projection display screens that reduce the reflectance of regions 110 of the projection display screen 102 to low intensity incident projected light. This results in the low intensity regions 110 becoming less reflective as compared with the reflectance of regions of the screen that receive high intensity light. In this disclosure, incident projected light 108 is considered that light that is applied from the light projection portion 104 onto the projection display screen 102.

Figure 4:
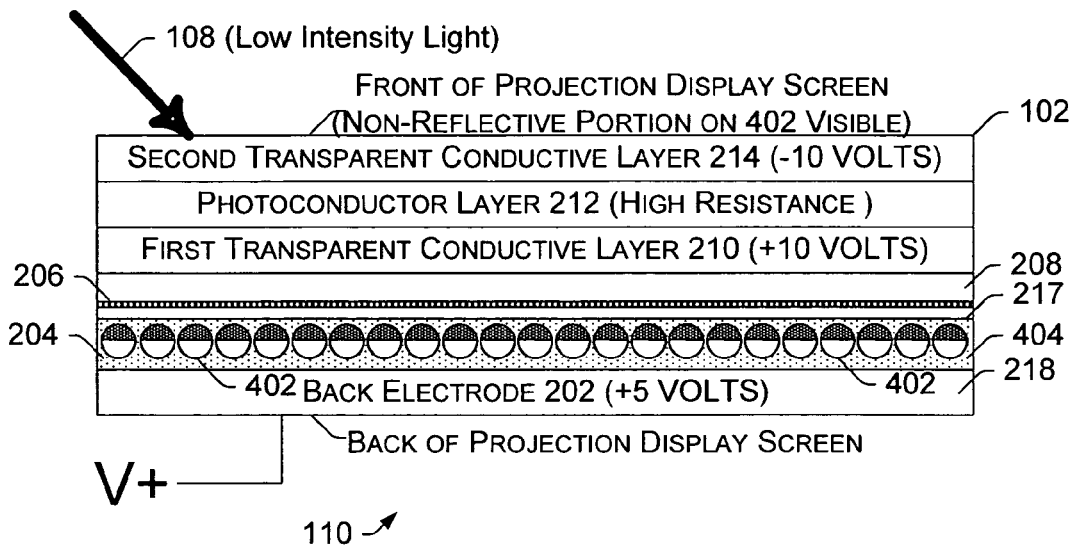
FIG. 4 is a cross-sectional view of another embodiment of a region of the projection display screen of FIG. 1, including rotating bi-color particles (e.g., balls) of FIG. 1 with a low intensity of incident projected light applied thereto.
Figure 5:
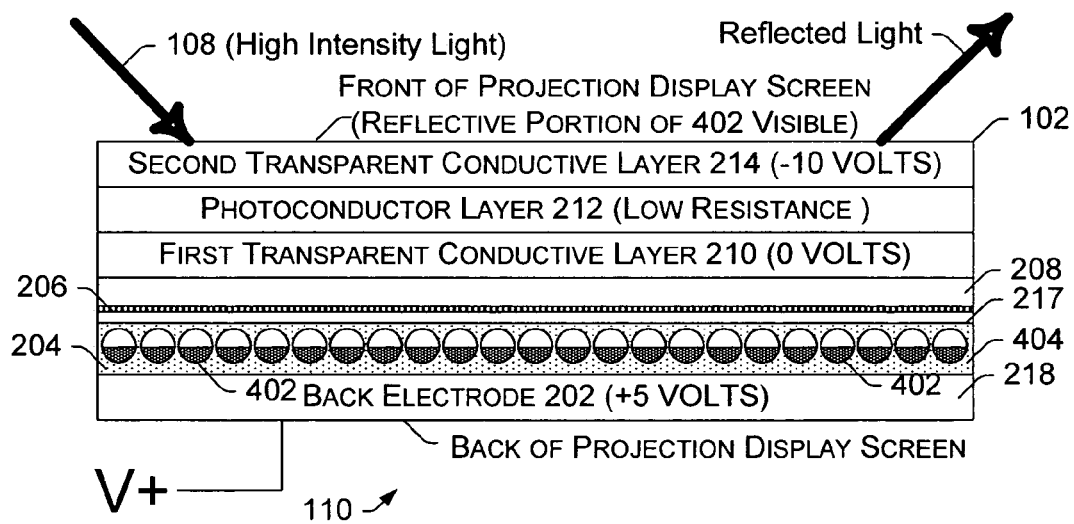
FIG. 5 shows a region of the projection display screen of FIG. 4 with a high intensity of incident projected light applied thereto.
Figure 6:
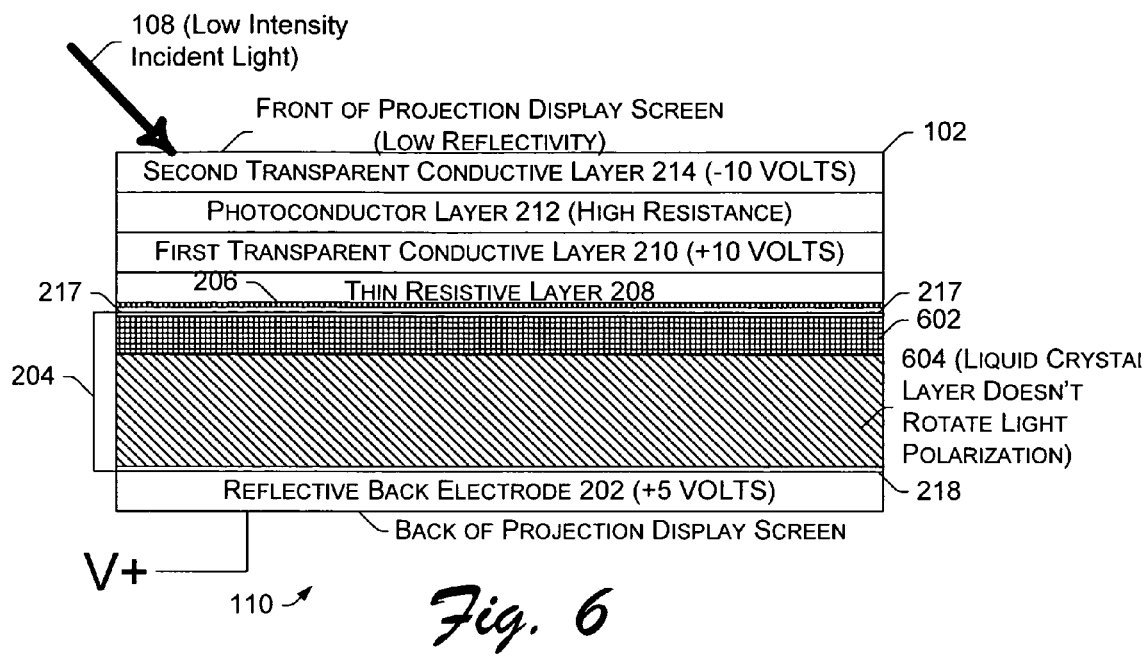
FIG. 6 is a cross-sectional view of another embodiment of a region of the projection display screen of FIG. 1 including a polarizing layer and a liquid crystal layer with a low intensity of incident projected light applied thereto.
Figure 7:
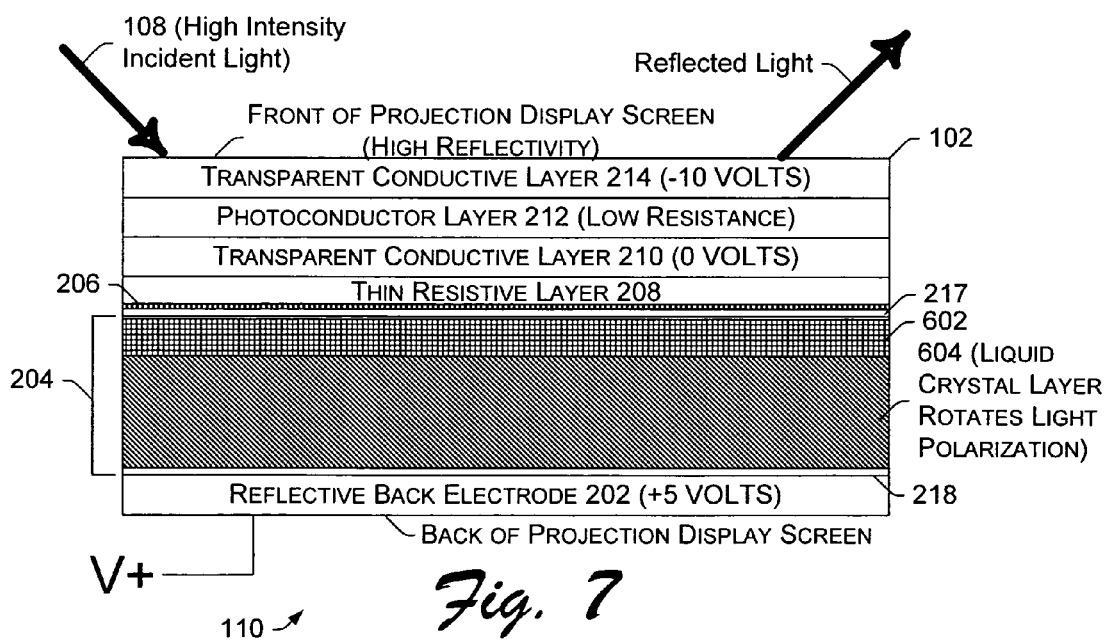
FIG. 7 shows a region of the projection display screen of FIG. 6 with a high intensity of incident projected light applied thereto.

The concepts as described in this disclosure are applied to any projection display screen 102 that include (but are not limited to) electronic ink (shown as a region 110 of the screen in FIGS. 2 and 3) such as developed by E Ink Corporation of Cambridge, Mass.; rotatable bi-color minute balls sold under the tradename of SmartPaper™ (shown as a region 110 of the screen in FIGS. 4 and 5) by Gyricon of Ann Arbor, Mich.; a polarizing layer combined with a liquid crystal layer as described with respect to FIGS. 6 and 7; and a de-wetting mechanism as described with respect to FIGS. 8, 9, 10, and 11.

Each of these embodiments of the projection display screen 102 act to project light of any desired projected color, bandwidth, and intensity by electronically altering the reflectivity of particular regions 110 of the projection display screen 102 in response to the applied incident projected light intensity within a prescribed bandwidth (or combination of bandwidths). Any other embodiment of the projection display screen that performs a similar operation (not limited to intensity threshold of light, spectrum band of light, or polarization of light) is within the intended scope of the present disclosure.

Figure 2:
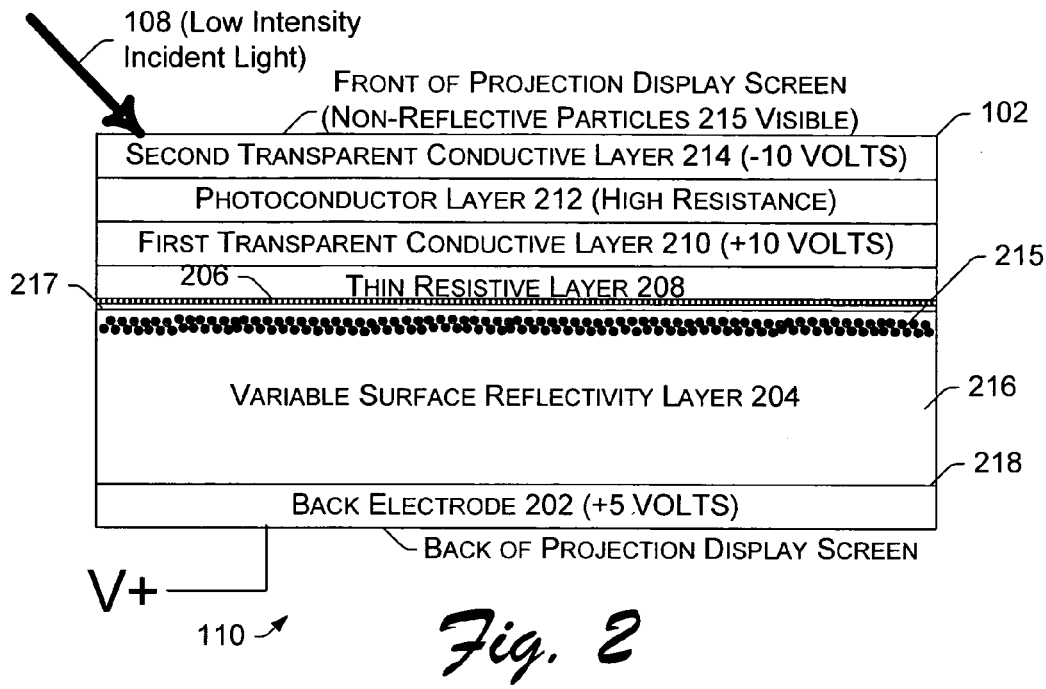
FIG. 2 is a cross-sectional view of one embodiment of a region of the projection display screen of FIG. 1 including electronic ink with a low intensity of incident projected light applied thereto.

In different embodiments, altering the reflectivity of particular regions 110 based of a filter (not shown) acts to alter the characteristics of the incident projected light. Such filtering is based on such characteristics of the incident projected light as the intensity of the threshold of the incident projected light, the spectrum band of the incident projected light, or the polarization of the incident projected light. The filter can either filter light that is applied to the photoconductor layer 212 (e.g., either by placing a filter element in or above the second transparent conductive layer 214 as shown in FIG. 2); or by alternatively positioning a filter to any layer above the variable surface reflectivity layer 204. Positioning a filter above the photoconductor layer 212 effects the incident projected light to the photoconductor layer that determines the electrical bias produced by the photoconductor layer 212 that in turn determines whether the variable surface reflectivity layer is in its high reflective state or its low reflective state. Positioning a filter above the variable surface reflectivity layer 204 determines the characteristics of the light that the variable surface reflectivity layer reflects.

Figure 8:
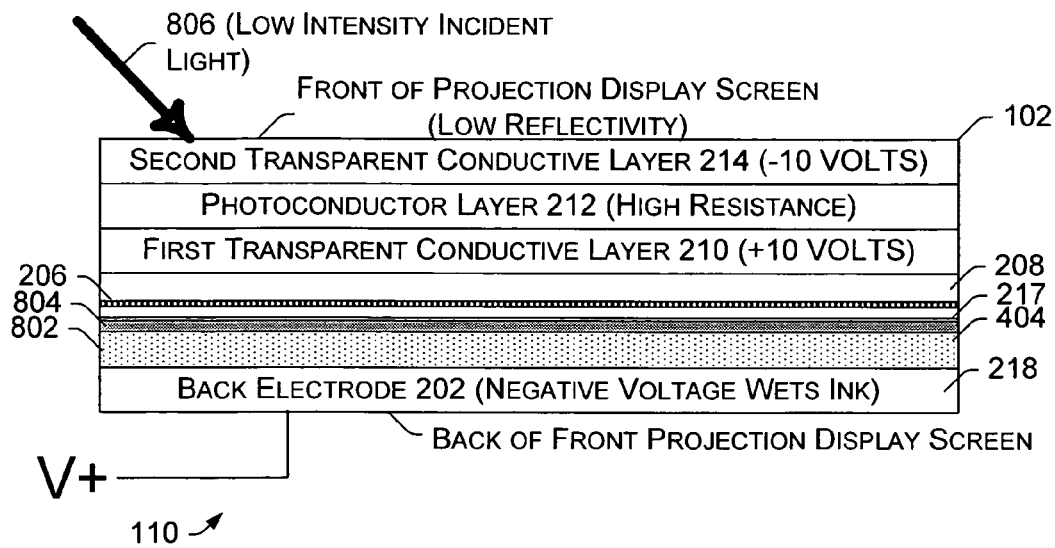
FIG. 8 is a cross-sectional view of another embodiment of a region of the projection display screen of FIG. 1 including a de-wetting material with a low intensity of incident projected light applied thereto.
Figure 9:
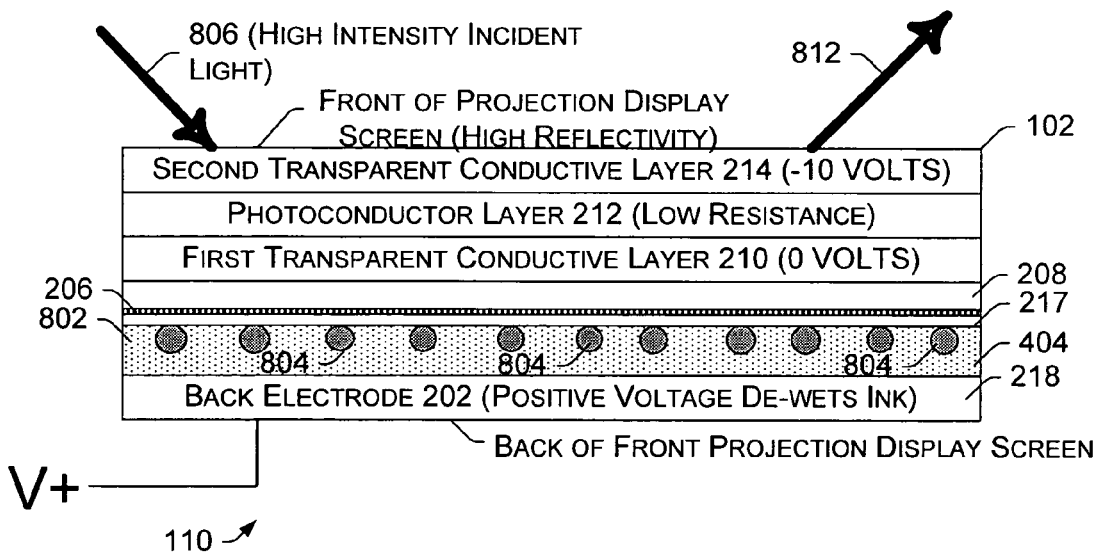
FIG. 9 shows a region of the projection display screen of FIG. 8 with a high intensity of incident projected light applied thereto.
Figure 10:
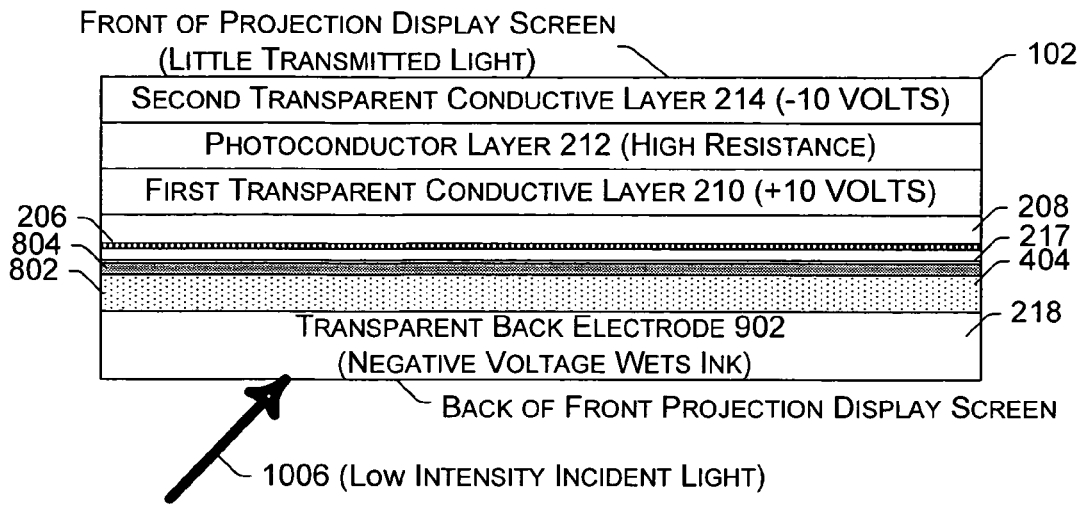
FIG. 10 is a cross-sectional view of another embodiment of a region of the projection display screen of FIG. 1 including a de-wetting material with a low intensity of incident projected light applied thereto.
Figure 11:
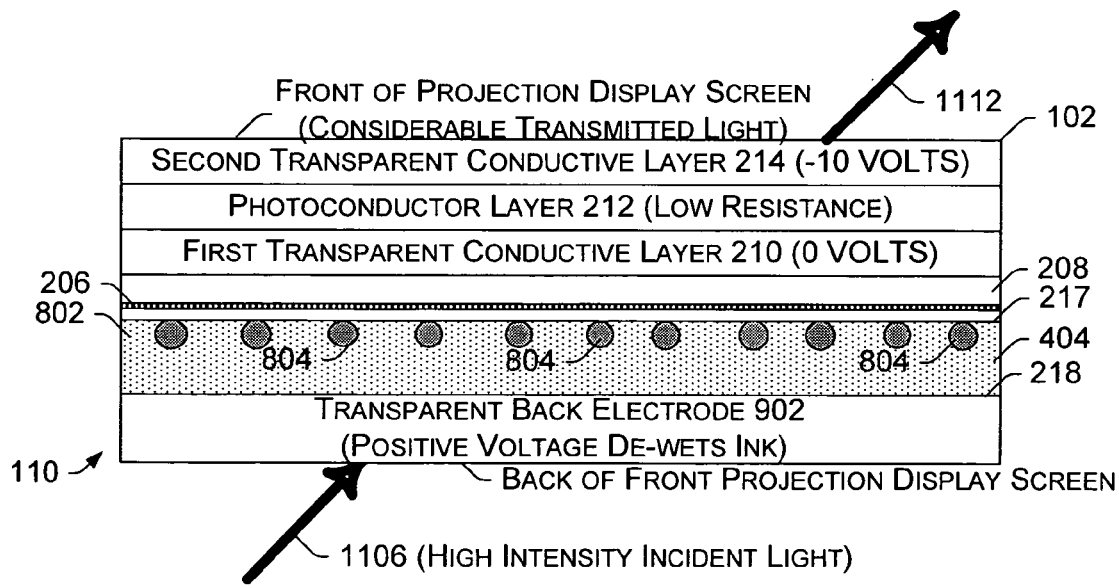
FIG. 11 shows a region of the projection display screen of FIG. 10 that has a high intensity of incident projected light applied thereto.

The concepts described herein are applicable to those embodiments of the projection display screen that displays two colors as well as multichromatic projection display screens. Certain embodiments of the projection display screen 102 include an electrostatic material that automatically change displayed color responsive to applied charge potential or polarity. The structure and operation of different embodiment of the projection display screen 102 as shown in FIG. 1 is now described with respect to FIGS. 2 and 3; FIGS. 4 and 5; FIGS. 6 and 7; FIGS. 8 and 9; FIGS. 10 and 11; and FIG. 12.

Figure 3:
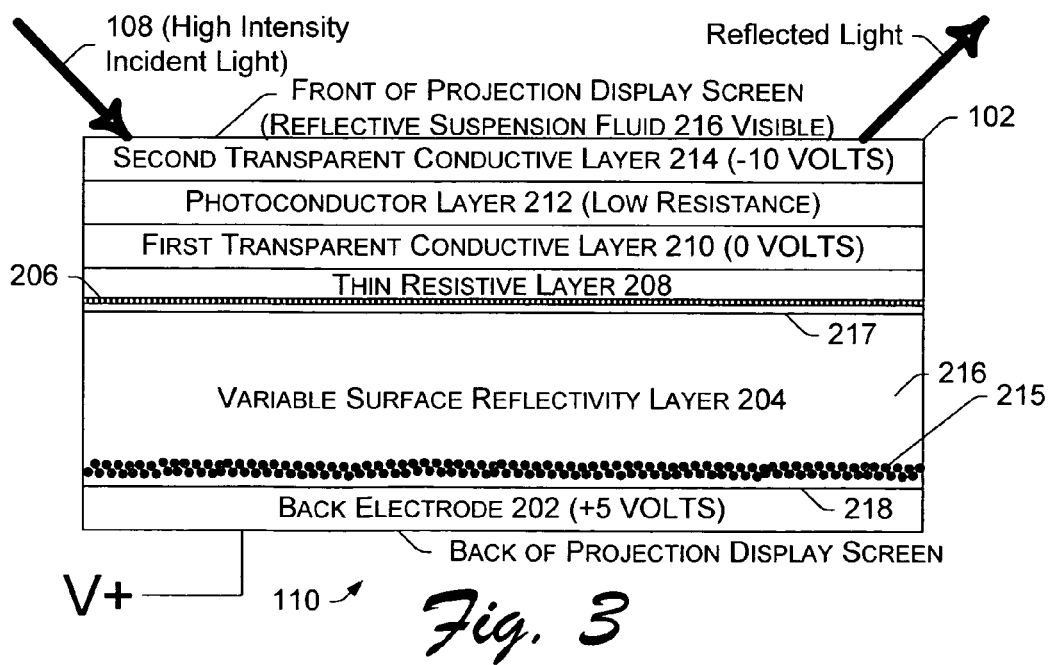
FIG. 3 is the region of the projection display screen of FIG. 2 with a high intensity of incident projected light applied thereto.

In one embodiment as described with respect to FIGS. 2 and 3 the projection display screen 102 includes the following thin film layers that can be fabricated using known processing techniques (such as suitable etching and deposition): a) a back electrode 202; b) a variable surface reflectivity layer 204 that can change its surface reflectivity at specific regions in response to an applied potential (that may be in response to the applying the incident projected light) or by some other mechanism; c) a network of highly conductive metal 206 (e.g., a high transparency "mesh") that can be used to conduct electricity from the sides of the projection display screen 102 to apply an electric potential at the interior of the cells of the projection display screen; d) a thin resistive layer 208; e) a first transparent conductive layer 210 such as Indium Tin Oxide (ITO) that forms a lower layer of a photoconductor layer; f) the photoconductor layer 212; and g) a second transparent conductive layer 214 such as ITO that forms the upper layer of the photoconductor layer 212.

The network of highly conductive metal 206 is formed in a mesh to allow the color of the variable surface reflectivity layer 218 to be transmitted upwardly to the front of the front projection display screen and thereby be visible to the user. All layers above the variable surface reflective layer 204 as shown in FIG. 2 are light transmissive, and therefore the light reflectivity of the variable surface reflectivity layer 204 in each region 110 of the projection display screen 102 determines whether that region will reflect or absorb light. The network of highly conductive metal 206 has to be able to apply a varying potential to the variable surface reflectivity layer to change the reflectivity of the variable surface reflector layer as displayed to the front of the projection display screen.

The FIGS. 2 and 3 embodiments of the variable surface reflectivity layer 204 include electronic ink such as developed by E Ink. The electronic ink is contained within a display region 110, and includes black particles 215 (that may be shaped as spheres, balls, or other shapes) that are colored black (which provides a low reflectivity and high absorption to light) and are suspended in a white reflective fluid 216. The mass of the particles can be made roughly equivalent to that of the suspending reflective fluid 216 such that any electric field applied to the particles will act to displace the particles within the fluid.

All the layers above and including the variable surface reflectivity layer 204 including the front plane 217 are optically clear to allow incident projected light to be applied to and/or reflect from the particles. A black (low reflectivity) particle 215 can be attracted to the front of the variable surface reflectivity layer 204 (towards the front plane 217) or forced towards the back of the variable surface reflectivity layer 204 (towards the back plane 218) based on a polarity applied across the variable surface reflectivity layer 204 within the region 110. If a particular flux is applied to the region 110 which would result from the application of the low intensity projected light, the black particles 215 are displaced to adjacent the front plane 217 as shown in FIG. 2, and the projection display screen 102 at that region appears black because of the low reflectivity (high absorbance) of the particles.

If an opposed flux is applied to the region 110 which would result from the application of high intensity projected light, the black particles 215 are displaced to adjacent the back plane 218 and the projection display screen 102 at that region is highly reflective (e.g., appears white) because the high reflectivity of the suspending fluid covers the low reflectivity of the particles. Reducing the reflectivity of the areas of the projection display screen 202 that are receiving low intensity light assists the display to reduce the black level illumination (with ambient light) in the projection display system. There are several possible designs for a projection display screen 102 using the rapid response electronic ink (that can be used to improve cost, image quality, etc.).

Conventional projection display screens usually have a continuously white surface to provide a constantly high reflectivity to the incident projected light. When the intensity of the incident projected light is reduced or no incident light is applied (such as occurs in black, or darker, portions of the conventional screens), there is a perceived black level to the projection display screen 102 for the user. As the ambient light in the room is increased such as occurs when a room becomes brighter, those regions receiving low intensity incident light (e.g., black regions) of conventional systems in the projection display screen 102 have a greater intensity, and therefore the projected image fades on the projection display screen. The color of these regions of commercially available versions of the projection display screen that receives low intensity light is therefore largely determined by the ambient light that is being applied within the room.

In the embodiment of the projection display screen 102 as shown in FIGS. 2 and 3, the back electrode 202 is maintained continuously at +5V potential; while the first transparent conductive (ITO) layer 210 is initially maintained at +10V; and the second transparent conductive (ITO) layer 214 is initially held at −10V. It is envisioned that the backplane could be switched off thereby lock the image on the screen and become non-responsive to the projected incident projected light. The particular voltages in the specification are for illustration only, and are not intended to be limiting. When low intensity projected light impinges on the projection display screen 102, the photoconductor layer 212 remains in a high resistance state and the electric field set up across the electronic ink layer between the back electrode (at +5V) and the first transparent conductive layer 210 (at +10V) results in a low reflectivity (e.g., black) surface being projected to the user through the second transparent conductive layer 214 since the dark particles are being pulled toward the front plane 217.

When incident projected light of a sufficient intensity (at a particular bandwidth, color, polarity, etc., as described above) is applied to the projection display screen 102, the electrical resistance of the photoconductor layer 212 decreases and forms a conductive path between the first transparent conductive layer 210 and the second transparent conductive layer 214. This conductive path between the two conductive layers 210 and 214 causes the voltage to drop across the thin resistive layer 208, pulling the voltage of the first transparent conductive layer 210 down from +10V to 0V in the region of the incident projected light. This pulling down of the voltage results in a reversal of the electric field across the variable surface reflectivity (e.g., electronic ink) layer 204, and produces a change in the reflectivity of the projection display screen 102 from low reflectivity (black) to high reflectivity (white).

The operation of the projection display screen 102 is reversed for example in different embodiments by changing the reflectivity of the suspended particles and the suspending fluid, and by reversing the polarity of the charged particles. The resistivity of the first transparent conductive layer 210 is configured to be high compared to the highly conductive metal 206 and the second transparent conductive layer 214 to provide the necessary voltage pull down to change the reflectivity of the particular region of the projection display screen 102.

FIGS. 2 and 3 provide the photoconductor layer which is a device responsive to changes in light intensity. When only a low intensity incident projected light is applied to the front of a region of the projection display screen as shown in FIG. 2, the resistance of the photoconductor layer is at its high resistance level, and the voltage of the first transparent conductance layer 210 is able to be maintained at its high voltage level with respect to the second transparent conductive layer 214. By maintaining such a voltage differential between the first transparent conductor layer 214 to the back electrode (+5 volts) as shown in FIG. 2, the low reflectivity particles 215 are pulled to the front plane 217, and the region of the projection display screen will be in its low reflectivity state.

As a greater intensity of incident projected light is applied to the region of the projection display screen, the electrical resistance of the photoconductor layer 212 decreases. By decreasing the electrical resistance of the photoconductor layer, the voltage of the first transparent conductive layer is pulled to closer to the voltage of the second transparent conductive layer 214 (which pulls the first transparent conductive layer 212 which is 10 volts towards 0 volts) in FIG. 3. If the voltage of the first transparent conductive layer 210 is lower than the back electrode 202, then the particles 215 will be pulled toward the back plane 219. In this manner, providing the photoconductive layer with less electrical resistance has the effect of decreasing the reflectivity of those regions of the projection display screen 102 at which dark light is being applied using electronic ink. Recent developments of electronic ink allow for switching between its high resistanve state to its low resistance state at video frame rates (15 ms) to improve the operation of the projection display apparatus 100.

In alternate designs the photoconductor layer 212 could be replaced with a variety of active thinfilm devices to produce the desired turn off/on characteristics of the projection display screen 102 when the intensity threshold value of incident projected light is achieved. Another design variation could improve the reflectivity of the projection display screen 102 by using a single transparent conductive (ITO) layer on the viewing side and making photo-active connections through the variable surface reflectivity layer 204 to a potential on the backside of the projection display screen 102. The particular layers in which the potential is described as being switched are illustrative, and represents a design choice among different embodiments.

FIGS. 4 and 5 show another embodiment of projection display screen 102 that can change its optical reflectivity at each region in response to the intensity of light applied at that region. In the FIGS. 4 and 5 embodiment of the projection display screen 102, the variable surface reflectivity layer 204 is filled with a number of bi-color particles 402 (each color has a different reflectivity such as black and white). One example of the bi-color particles 402 are minute objects such as balls that are colored half white and half black, with one polarity being associated with each color as developed and made commercially available by Gyricon. The white half of each bi-color particle has greater reflectivity than the white half of the bi-color particle A clear and relatively thin layer of the suspension liquid 404 is contained within the variable surface reflectivity layer 204 that suspends the bi-color particles 402 while permitting free rotation of the particles in their desired direction. As such, when the electric field that is applied across the bi-color particles within the variable surface reflective layer are reversed, the orientation of the white region or the black region of the bi-color particles will be reversed.

When an appropriate potential at an appropriate location is applied, all of the particles 402 within the variable surface reflective layer will be oriented so their low reflectivity portion is visible (the black half of all of the particles will be visible from the front). When another appropriate potential is applied at an appropriate location, all of the particles 402 within the variable surface reflective layer will display their high reflective sides (e.g., the white half of all of the particles will be visible from the front).

While the effect of applying a low intensity light to a region of the projection display screen 102 in FIG. 2 will be to force the black particles 215 within the variable surface reflectivity layer towards the front plane 217 (and therefore make the projection display screen 102 appear black), the effect of applying low intensity light in FIG. 4 will be to make the bi-color particles 402 rotate to display their black side out of the front side. The effect of either of these embodiments will be to cause the projection display screen 102 to display their low reflectivity states when the incident projected light is low intensity. Providing certain gray scale can be permitted by turning certain regions on and others off within the projection display screen in a prescribed percentage. Alternatively, in a pixel-based system, gray scale can be provided by dithering.

While the effect of applying high intensity light to a region of the projection display screen 102 in FIG. 2 will be to force the black particles 215 within the variable surface reflectivity layer towards the back plane 218 (and therefore make the projection display screen 102 highly reflective), the effect of applying high intensity light in FIG. 4 will be to make the bi-color particles 402 rotate to display their highly-reflective side out towards the front plane 217. The effect of either of these embodiments in FIG. 2 or 4 will be to cause the region of the projection display screen 102 to display a highly reflective surface when the incident projected light has a high intensity.

Another embodiment of the projection display screen 102 with another embodiment of the variable surface reflectivity later 204 is now described with respect to FIGS. 6 and 7. This embodiment includes a polarizing layer 602 and a liquid crystal layer 604. The back electrode is configured to be reflective to reflect any light traveling downwardly through the polarizing layer 604 back up into the polarizing layer. FIGS. 6 and 7 respectively show a low reflection state and a high reflection state in which the liquid crystal layer 604 respectively does not rotate the light traveling there through and rotates the light traveling there through.

The polarizing layer 602 polarizes light that is traveling in a downward direction (relative to FIGS. 6 and 7) in one specific direction that is perpendicular to the downward direction of travel. The liquid crystal layer 604 can be changed between two liquid crystal states: a first polarizing state in which the liquid crystal layer 604 does not rotate the polarity of light passing there through, and a second polarizing state in which the liquid crystal layer 604 rotates the polarity of light passing there through. The layers of the projection display screen, except for the variable surface reflection layer, are similar to that described with respect to the embodiment shown in FIGS. 2 and 3.

When in the first polarizing state, the polarized direction of the light is not rotated, and as such the direction of polarization of the polarized light that has been reflected off the reflective back electrode 202 that continuing up through the polarizing layer 602 matches the direction of polarization of the polarizing layer, and therefore this polarized light can pass through the polarization layer to the front of the projection display screen 102 to the user. The first polarizing state where the liquid crystal layer does not rotate the direction of the polarization of the light therefore is equated to the high reflectivity state for the variable surface reflecting layer.

When in the second polarizing state as shown in FIG. 6, the direction of polarization is not rotated within the liquid crystal device layer. As such, the rotated polarized light cannot return from the liquid crystal layer 604 into the polarizing layer 602 to be projected out of the front of the projection display screen 102. As such, as shown in FIG. 5, incident projected light passes from the front of the projection display screen and continues into the polarizing layer 602 (where the light is polarized), and into the liquid crystal layer 604 in which the polarizability of the light is rotated. The light then continues to the reflective back electrode 202 and reflects to return through the polarizing layer). Since the polarizability of the light is rotated within the liquid crystal layer 604, the light returning through the liquid crystal layer cannot enter the polarizing layer, and therefore the incident projected light that enters through the polarizing layer 602 of the variable surface reflecting layer 204 cannot return through the polarizing layer (and in effect becomes absorbed by the variable surface reflecting layer). The second polarizing state therefore is equated to the low reflectivity state for the variable surface reflecting layer.

As shown in FIGS. 6 and 7, the variable surface reflecting layer can be altered from the low first polarizing state to the second polarizing state by the application of high intensity light to the front of the projection display screen that travels to the photoconductor layer. The transition of the liquid layer 604 into the second polarizing states is a result of the photoconductive layer becoming less electrically resistant in response to the increased intensity of the incident light. As a result, this region 110 of the projection display screen 102 will be more reflective in the FIG. 7 high incident projected light instance than in the FIG. 6 low incident projected light instance.

FIGS. 8 and 9 show a region 110 of the projection display screen 102 including another embodiment of the variable surface reflective layer 802. The variable surface reflective layer 802 includes an ink layer 804 that is contained within an optically transmissive liquid. The ink layer 804 can be transitioned between a wetted state as shown in FIG. 8 in which the ink forms in a substantially even layer, or in a de-wetted state as shown in FIG. 9 in which the ink forms in globules.

When in the wetted state as shown in FIG. 8, the ink layer 804 is spread substantially evenly across the width of the variable surface reflective layer 802 to cover the entirety of the variable surface reflective layer. The ink layer is in the wetted state when low intensity incident projected light is applied to the upper surface, the photoconductor layer 212 is in its highly resistive state, and the resulting potential is applied between the first transparent conductor layer 210 and the back electrode 202 to the ink. Under the first potential, the ink absorbs the light applied thereto, and little light is reflected off the reflective back electrode 202.

When in the de-wetted state as shown in FIG. 9 as results from the application of a second potential, the ink layer 804 forms spherical globules that are distributed across the width of the variable surface reflective layer 802. While the dimensions of the globules 804 of the ink as shown in FIG. 9 is relatively large compared to the depth thin layer as shown in FIG. 8, in FIG. 9 the globules cover only a small percentage of the horizontal plane of the variable surface reflective layer (e.g., 10% to 20%). In front-lit versions of the embodiments of the projection display screen 102 shown in FIGS. 8 and 9, the back electrode 202 is optically reflective to reflect light to pass into the variable surface reflective layer 802. As such, light that is applied from above (e.g., the high intensity incident projected light 806) will primarily pass between the globules 804, reflect off the reflective back electrode 202, and be transmitted upwardly again towards the front of the projection display screen 102. Light that is absorbed by the substantially even ink layer 804 as shown in FIG. 8 will not be able to be reflected off the back electrode 218.

Incident light can be applied from either the front or the back of the projection display screen 102 as indicated by respective front incident light arrow 806 and the back incident light arrow 808. When light is applied to the front of the wetted ink layer 804 of the variable surface reflective layer 802 as shown in FIG. 8, the light reflects off the surface of the ink and colored filtered light is directed out of the front of the projection display screen. When light is applied to the back of the wetted ink layer 804 of the variable surface reflective layer 802, the light is transmitted and filtered through the depth of the ink and colored filtered light and is directed out of the front of the projection display screen as shown by arrow 810. The wetted state as shown in FIG. 8 corresponds to the low reflectance state for light that is applied to either the front or the back of the projection display screen.

All of the embodiments of the projections display screen 102 as described with respect to FIGS. 2 to 9 are front projection display screen devices since incident projected light is applied to the front of the projection display screen. One back-lit embodiment of the projection display screen 102 is shown in FIGS. 10 and 11 that include a similarly operating variable surface transmissive layer 1002 to the variable surface reflectance layer 802 as described with respect to the embodiment described in FIGS. 8 and 9. In the FIGS. 10 and 11 embodiment, an optically transparent back electrode 1004 is provided to allow light to pass into the variable surface transmissive layer 1002.

Since the variable surface transmissive layer 1002 operates as described with respect to the FIGS. 8 and 9 embodiment, when the ink layer 804 is in the form of an even layer, low intensity incident projected light 1006 from below will not pass upwardly because the ink will absorb the incident projected light, and let little light pass.

When high intensity incident projected light 1106 as shown in FIG. 11 is applied to the back of the de-wetted ink layer 804 of the variable surface reflective layer 1002, the majority of the light is allowed to pass (e.g., is transmitted) through to pass out the front of the projection display screen as shown by arrow 1112 since only a small percentage is filtered by contacting the globules of the ink layer. The de-wetted state as shown in FIG. 10 corresponds to the highly transmissive state for light that is applied to the back of the projection display screen.

Figure 12:
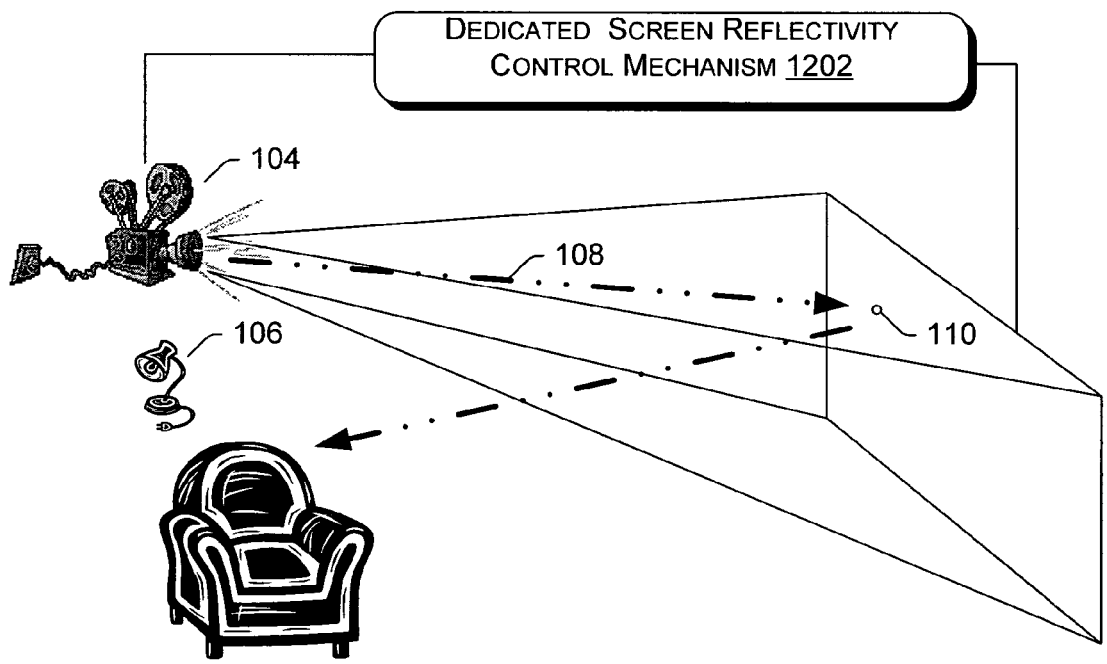
FIG. 12 shows another embodiment of the projection display apparatus that includes a dedicated screen reflectivity control mechanism that acts to calibrate the light projected from the light projection region with the color of the projection display screen.

FIG. 12 shows one embodiment of a dedicated reflectivity screen control mechanism 1202 in which a dedicated reflectivity screen control mechanism 1202 can suitably adjust the light reflectivity of the corresponding region of the projection display screen 102 in response to an intensity of the incident projected light as determined from the light projection portion to the projection display screen (as compared to an intensity of light that is received at the projection display screen). The dedicated reflectivity screen control mechanism 1202 reduces the reflectivity of the low intensity region considering the incident projected light transmitted out of each region of the light projection portion. Different embodiments of the dedicated reflectivity screen control mechanism 1202 can be either digital (processor) or analog (electronic) based. The dedicated reflectivity screen control mechanism 1202 thereby coordinates the reflectivity of the projection display screen 102 with the intensity of the light that is projected from the light projection portion 104 for that region of the projection display screen.

According to the embodiment of the projection display apparatus 100 as described with respect to FIG. 12, a dedicated screen reflectivity control mechanism 1202 adjusts the reflectivity of the regions 110 of the projection display screen 102 based on the corresponding intensity of light projected by the light projecting portion 104 at the projection display screen 102 based on the sensed intensity or band of light (e.g., by sensing the color or intensity of the light projected by the light projection portion) for a corresponding location of the light projection portion to the region 110 of the screen. The location of the light projection display screen 102 are related to the location of light projected from the light protection portion by the relative position relative to the image (e.g., the region 110 is located a certain percentage of the distance across the image and another percentage from the top of the image).

Alternatively, the intensity of light generated at a particular pixel location within the light projection portion 104 can be quantified and compared to the intensity threshold. If the projected light intensity at that projected pixel location is above the intensity threshold value, then the dedicated reflectivity screen control mechanism can be actuated at that pixel, and convert the corresponding region 110 to a high reflectivity level to reflect the incident display light. If the projected light intensity at that projected pixel location is below the intensity threshold value, then the dedicated reflectivity screen control mechanism is not actuated at that pixel, and the corresponding region 110 is not converted to a high reflectivity level (and the incident display light is not reflected). Any of these techniques operate such that the light intensity at each region 110 of the light projection display screen is determined, and the reflectivity/absorbance of the screen is suitably adjusted, based on the wavelength of the light (or lack of light) of the incident projected light 108 at each region 110.

The dedicated screen reflectivity control mechanism 1202 can also operate using an invisible frequency of light (e.g., infrared) that is also associated with the incident light applied from the light projection portion 104. For instance, a color wheel can be incorporated in front of the light projection portion 104 that contains not only the common visible spectrums of red, green, and blue, but also the invisible spectrum of infrared. Those invisible light regions will be used to convert that region to its high reflectivity state as described above. The intensity threshold of the regions of the projection display screen can be set to respond to only the invisible light, and as such the invisible light will control which regions of the projection display screen are in a highly reflective state and which regions are in a low reflectance state.

Figure 13:
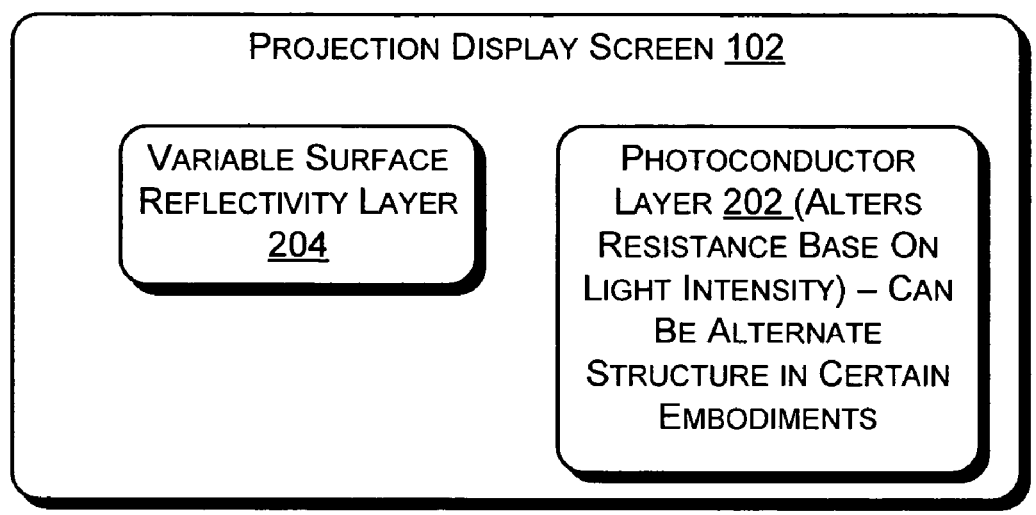
FIG. 13 shows a block diagram of one embodiment of a projection display screen.

FIG. 13 shows a block diagram summarizing a number of different embodiments of a region of the projection display screen 102 as described with respect to FIGS. 1 to 12. Each embodiment of the projection display screen 102 includes the variable surface reflectance layer 204. The variable surface reflectance layer 204 transitions the projection display screen between its high reflectance and its low reflectance state based on the intensity of the incident projected light. The photoconductor layer 202 exists in certain embodiments, and receives the incident projected light, and in general alters the biasing of the variable surface projection layer 204 that acts to transition the projection display screen between its high reflectance and its low reflectance state.

This disclosure thereby can relatively inexpensively provide good contrast to large images to projection display systems. Having herein set forth preferred embodiments of the present invention, it is anticipated that suitable modifications can be made thereto which will nonetheless remain within the scope of the present invention.

What is claimed is:

1. An apparatus, comprising:
a projection display screen that can electrically alter the reflectivity of a region of the projection display screen in response to the intensity of incident projected light that is applied at the region, a reflectivity layer including a material of a first reflectivity suspended in a liquid of a second reflectivity, wherein the material is displaced toward a light surface when a first electromagnetic field is applied, and wherein a region of the material is displaced away from the light surface to make the liquid visible through the light surface when a second electromagnetic field is applied across a region of the reflectivity layer.

2. The apparatus of claim 1, wherein the projection display screen level of incident projected light is above a prescribed intensity threshold value for ambient light.

3. The apparatus of claim 1, further comprising:
a photoconductor layer that can apply a potential to the reflectivity layer to change its light reflectivity in response to applied incident projected light, wherein the reflectivity layer is a variable surface reflectivity layer that changes its light reflectivity in response to a change in applied potential.

4. The apparatus of claim 3, in which the projection display apparatus is front projection display apparatus, and the variable surface reflectivity layer comprises electronic ink.

5. The apparatus of claim 3, in which the variable surface reflectivity layer comprises a polarizing layer and a liquid crystal layer.

6. The apparatus of claim 3, further comprising providing a filter over the photoconductor layer that filters the band of light that is applied to the photoconductor layer.

7. The apparatus of claim 3, further comprising providing a filter over the photoconductor layer that filters the polarization of light that is applied to the photoconductor layer.

8. The apparatus of claim 3, further comprising providing a filter over the variable surface reflectivity layer that filters the band of light that is applied to the variable surface reflectivity layer.

9. The apparatus of claim 3, further comprising providing a filter over the variable surface reflectivity layer that filters the polarization of light that is applied to the variable surface reflectivity layer.

10. The apparatus of claim 3, wherein the variable surface reflectivity layer comprises objects, each object having different surface regions of different reflectivities, wherein each object is rotatable to display a first reflectivity when a potential is applied, and each object is rotatable to display a second reflectivity when the potential is not applied.

11. The apparatus of claim 3, in which the variable surface reflectivity layer comprises an electrostatically de-wettable material.

12. The apparatus of claim 1, wherein a contrast of an image of a passive display is improved by using a display screen that changes its reflectivity at each location.

13. The apparatus of claim 1, further comprising a display surface, a back electrode, and a transparent conductive layer wherein the applied light includes an incident applied light that is at least partially reflected off the display surface, wherein the reflectance of the applied light off the incident projected light surface can be varied by altering a relative charge between the back electrode and the transparent conductive layer.

14. The apparatus of claim 13, wherein varying the reflectance of the applied light off the incident projected light surface acts to reduce a maximum black level of any region of an image that can be projected from the incident projected light surface.

15. The apparatus of claim 13, in which the projection display screen reacts to incident projected light to compensate for elevated black point caused by increasing the ambient light that is directed at the projection display screen.

16. The apparatus of claim 15, wherein the projection display screen is configured to reduce the light reflected from a segment of the projection display screen when the segment of the projection display screen is displaying a black level.

17. The apparatus of claim 1, wherein the projection display screen comprises an incident projected light surface and a back surface, projection display screen comprises:
a photoconductor layer whose conductivity changes as light that is applied to the incident projected light surface extends above a prescribed threshold, and wherein the reflectivity of the reflectivity layer, as viewed from the light surface, changes in response to changes in a potential applied to the reflectivity layer.

18. The apparatus of claim 17, wherein the reflectivity layer includes a number of objects that align in a first orientation wherein a first light reflectivity is directed toward the incident projected light surface to be visible from the incident projected light surface when a first charge is applied to a region of the incident projected light surface, and wherein a number of objects align in a second orientation wherein a second surface reflectivity is directed toward the incident projected light surface to be visible from the incident projected light surface when a second charge is applied to a region of the incident projected light surface.

19. The apparatus of claim 1, wherein the light that is applied at the location is in the form of an image.

20. The apparatus of claim 1, further comprising:
a light projection region that applies at least a region of the incident projected light on the projection display screen; and
a dedicated screen reflectivity control mechanism that can change the reflectivity of the projection display screen in response to an intensity of the incident projected light that is applied from the light projection region to the projection display screen, wherein the dedicated screen reflectivity control mechanism operates by determining the intensity of light at different regions as generated by the light projection portion.

21. The apparatus of claim 1, wherein the dedicated screen reflectivity control mechanism is electronically-based.

22. The apparatus of claim 1, wherein the dedicated screen reflectivity control mechanism is processor-based.

23. A method comprising:
providing a projection display screen with a variable surface reflectivity layer; and
varying the reflectivity of a region of the projection display screen in response to the intensity of incident projected light that is applied to the region of the projection display screen wherein the reflectivity of the reflectivity layer is changed by displacing a material of a first reflectivity suspended in a liquid of a second reflectivity towards an incident projected light surface when a first electromagnetic field is applied, and wherein a region of the material is displaced away from the light surface to make the liquid visible through the light surface when an electromagnetic field is applied across a region of the reflectivity layer.

24. The method of claim 23, further comprising increasing a black level of the projection display screen in response to increasing the intensity of the incident projected light applied to the projection display screen.

25. The method of claim 23, further comprising applying invisible light to vary the reflectance of the region of the projection display screen.

26. The method of claim 23, further comprising:
providing a photoconductor layer that can apply a potential to the variable surface reflectivity layer, wherein the variable surface reflectivity layer changes its surface reflectivity in response to an applied potential in response to the applying incident projected light based on the intensity of the incident projected light.

27. A projection display apparatus, comprising:
a projection display screen that can change at least a region of its reflectivity in response to applying incident projected light that is applied at the region, wherein the projection display screen comprises:
a variable surface reflectivity layer that changes its surface reflectivity in response to a change in applied potential, and
a photoconductor layer that can apply a potential to the variable surface reflectivity layer in response to applied incident projected light, wherein the variable surface reflectivity layer comprises a material of a first reflectivity suspended in a liquid of a second reflectivity, and the material is displaced towards an incident projected light surface when a first electromagnetic field is applied, and further wherein a region of the material is displaced away from the light surface to make the liquid visible through the light surface when a second electromagnetic field is applied across a region of the reflectivity layer.

28. The projection display apparatus of claim 27, wherein the variable surface reflectivity layer further comprises electronic ink.

29. The projection display apparatus of claim 27, wherein the variable surface reflectivity layer comprises a polarizing layer and a liquid crystal layer.

30. The projection display apparatus of claim 27, wherein the variable surface reflectivity layer comprises objects, each object having different segments of different colors, wherein each object is rotatable to display a material of the first reflectivity when the potential is applied, and each object is rotatable to display a material of the second reflectivity when the potential is not applied.

31. A method comprising:
providing a reflectivity layer of a projection display screen;
causing the areas of the projection display screen that are receiving a low intensity projected light to have a low reflectivity as compared to regions of the projection display screen that are receiving a high intensity projected light wherein the reflectivity layer comprises a material of a first reflectivity suspended in a liquid of a second reflectivity, and the material is displaced towards an light surface when the low intensity projected light is received, and further wherein a region of the material is displaced away from the light surface to make the liquid visible through the light surface when the high intensity projected light is received.

32. A projection display apparatus, comprising:
a projection display screen means for changing at least a region of its reflectivity in response to applying incident projected light that is applied at the region, wherein the projection display screen means comprises:
a variable surface reflectivity layer means for changing its surface reflectivity in response to a change in applied potential;
a photoconductor layer means for applying a potential to the variable surface reflectivity layer means in response to applied incident projected light; and
a variable surface reflectivity layer means for displacing a material of a first reflectivity suspended in a liquid of a second reflectivity towards an incident projected light surface when a first electromagnetic field is applied and wherein a region of the material is displaced away from the incident projected light surface to make the liquid visible through the incident projected light surface when a second electromagnetic field is applied across a region of the variable surface reflectivity layer.

33. The projection display apparatus of claim 32, wherein the variable surface reflectivity layer means includes means for altering the distance that particles of the reflectivity are located within a fluid of the second reflectivity that faces a user.

34. The projection display apparatus of claim 32, wherein the variable surface reflectivity layer means includes means for altering the orientation of multi-colored particles that are directed toward a user.

35. The projection display apparatus of claim 32, wherein the variable surface reflectivity layer means includes means for determining how much a liquid crystal layer rotates a polarization of light that is to be applied to a polarization layer toward a viewer.

36. The projection display apparatus of claim 32, wherein the variable surface reflectivity layer means includes means for altering an ink layer that light passes through on its way to a user between its wetted state and its non-wetted state.

* * * * *